May 28, 1957   J. PRESLICKA ET AL   2,793,872
FRONT WHEEL SUSPENSION FOR A FARM TRACTOR
Filed Feb. 17, 1956   2 Sheets-Sheet 1
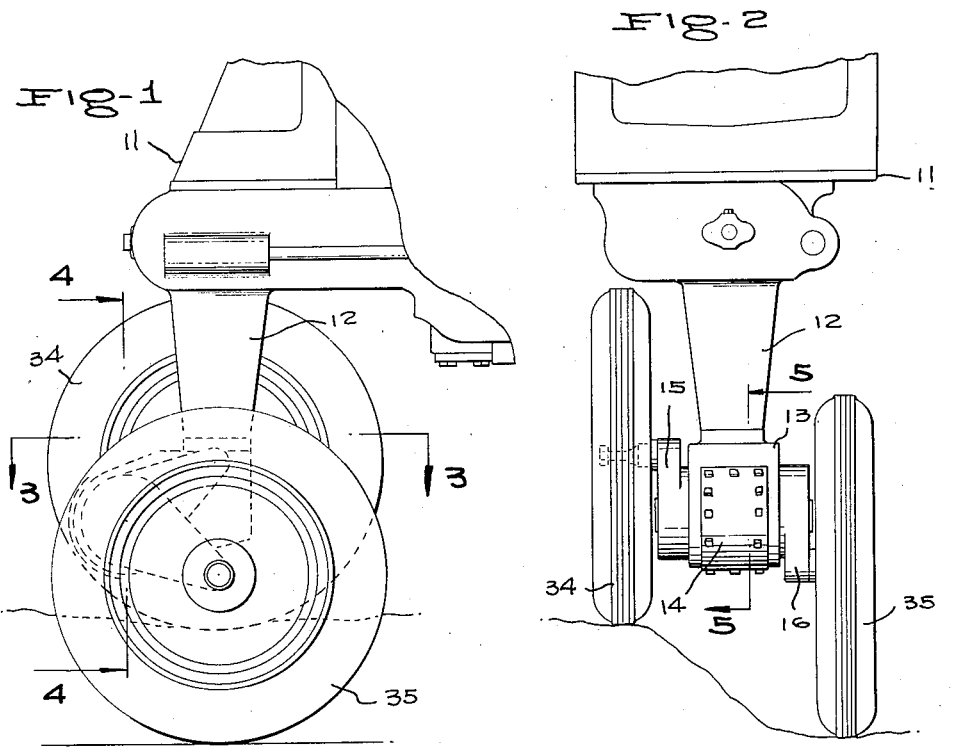
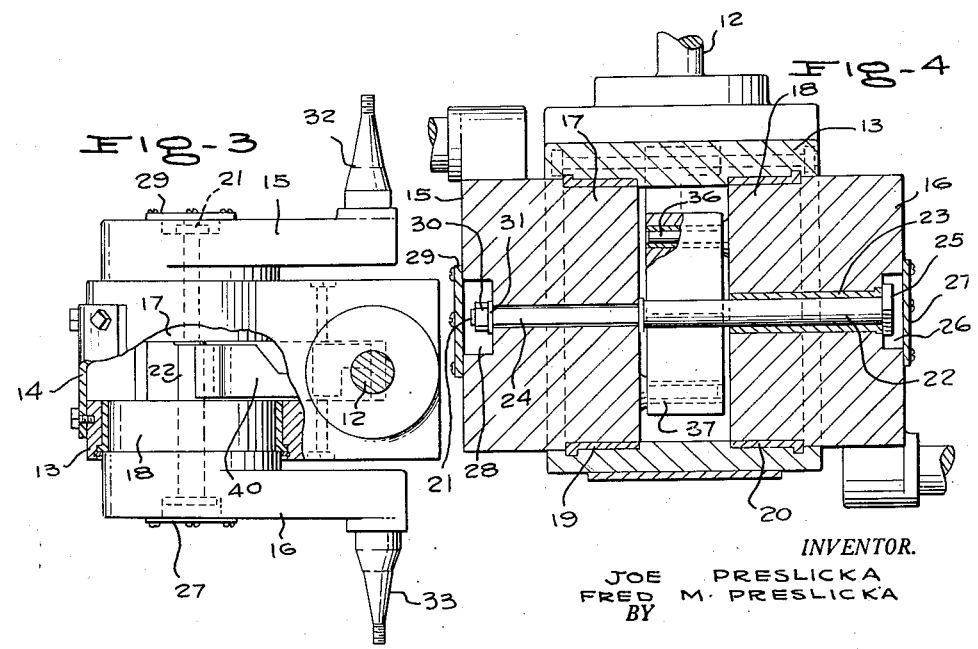
INVENTOR.
JOE PRESLICKA
FRED M. PRESLICKA
BY
McMorrow, Berman + Davidson
ATTORNEYS

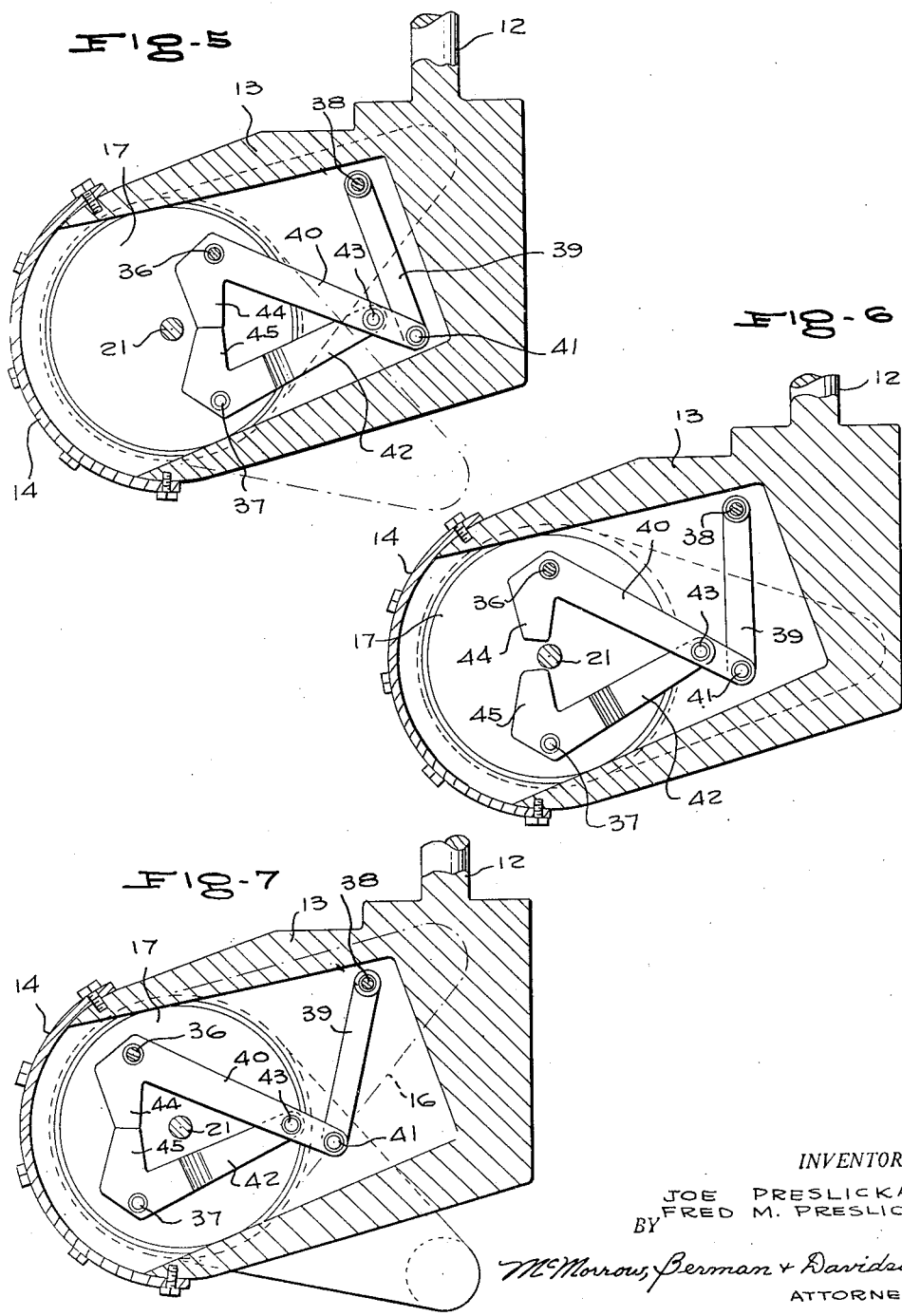

United States Patent Office 2,793,872
Patented May 28, 1957

2,793,872

FRONT WHEEL SUSPENSION FOR A FARM TRACTOR

Joe Preslicka and Fred M. Preslicka, Burke, S. Dak.

Application February 17, 1956, Serial No. 566,234

3 Claims. (Cl. 280—80)

This invention relates to improvements in vehicle wheel mountings, and more particularly to an improved front wheel suspension for a farm tractor.

The main object of the invention is to provide a novel and improved means for mounting the front wheels on a farm tractor to provide easier steering and to provide substantially uniform pressure on both front wheels, even where one of said wheels encounters an obstruction which elevates the wheel with respect to the other front wheel, or conversely, where one of the wheels rolls into a depression which lowers the wheel with respect to the other front wheel, the improved mounting involving simple components, being easy to install, and greatly improving the operating smoothness of the tractor.

A further object of the invention is to provide an improved front wheel suspension for a farm tractor, said suspension being relatively inexpensive to manufacture, being rugged in construction, and being arranged so that the force on the front wheels of the tractor is substantially equalized, regardless of the irregularities of the terrain over which the tractor moves, whereby wear and vibration of the tractor are substantially reduced and whereby the riding qualities of the tractor are greatly improved.

Further objects and advantages of the invention will become apparent from the following description and claims, and from the accompanying drawings, wherein:

Figure 1 is a side elevational view of the forward end portion of a farm tractor provided with an improved front wheel suspension according to the present invention.

Figure 2 is a front elevational view of the tractor portion shown in Figure 1.

Figure 3 is an enlarged horizontal cross sectional view taken on the line 3—3 of Figure 1.

Figure 4 is an enlarged vertical cross sectional view taken on the line 4—4 of Figure 1.

Figure 5 is an enlarged vertical cross sectional detail view taken on the line 5—5 of Figure 2.

Figure 6 is an enlarged vertical cross sectional detail view, similar to Figure 5, but showing the positions of the link elements of the suspension when both of the front wheels of the tractor are at the same elevation.

Figure 7 is a cross sectional detail view, similar to Figures 5 and 6, showing the positions of the link elements of the suspension when the front wheels are in relatively displaced vertical positions, opposite to the displaced positions shown in Figures 1 and 2.

Referring to the drawings, 11 generally designates a tractor body provided at its front end with a depending support member 12. The support 12 is provided at its bottom end with a downwardly and forwardly inclined housing 13 provided with the removable front cover plate 14, as shown in Figures 5 to 7. Designated at 15 and 16 are respective arms which are arranged in parallel longitudinal vertical planes and which are formed at their forward ends with the respective inwardly projecting cylindrical bearing portions 17 and 18 rotatably received in bearing sleeves 19 and 20 mounted in respective circular apertures formed in the side walls of the housing member 13 in transverse axial alignment, as is clearly shown in Figure 4. A transverse pivot bolt 21 rotatably connects the arms 15 and 16 at their bearing portions 17 and 18, said pivot bolt having an enlarged portion 22 rotatably received in an axial bearing sleeve 23 provided in the bearing portion 18 and having a reduced shank portion 24 extending axially through the bearing portion 17. The bolt 21 has a head 25 which is received in a recess 26 formed in the arm 16, said recess being provided with a cover plate 27. The bolt 21 has a reduced end portion received in a recess 28 formed in the arm 15, said recess 28 being provided with a removable cover plate 29. On the reduced portion of the bolt 21 is threadedly engaged a nut 30 which bears on a washer 31 engaged against the shouldered end portion of the shank 24 of the bolt, whereby the bolt defines a common pivot shaft for arms 15 and 16.

Arm 15 is provided at its free end with the wheel bearing shaft 32 and arm 16 is similarly provided at its free end with the wheel bearing shaft 33, the respective front wheels 34 and 35 being journaled on said wheel bearing shafts 32 and 33.

Rigidly secured to the arm bearing portion 18 above the axis of the bolt 21 is a horizontal pin member 36 which extends parallel to the axis of said bolt, as is clearly shown in Figure 4, and rigidly connected to the bearing portion 17 of arm 15 is a similar horizontal pin 37 which is spaced below the axis of bolt 21, the spacings of the pins 36 and 37 above and below the axis of pin 21 being substantially equal, and the pins being substantially in vertical alignment when the tractor wheels are at the same elevation, as shown in Figure 6. Designated at 38 is a transverse pin member extending through the upper rear corner portion of the interior of housing 13, as shown in Figure 5, and pivotally connected to said pin member 38 is a first link bar 39 which is located for rotation in a plane spaced midway between the arm bearing portions 17 and 18. Designated at 40 is a second link member which is pivotally connected at 41 to the lower end of the first link member 39 and which is pivotally engaged at its forward end on the upper pin 36. A third link bar 42 is pivotally connected at 43 to a portion of the second link bar 40 spaced forwardly from the end pivotal connection 41, as is clearly shown in Figure 5, the forward end portion of the link bar 42 being pivotally engaged on the lower transverse pin 37.

The respective link members 40 and 42 are formed at their forward ends with opposing abutment lugs 44 and 45 which project inwardly towards each other and which are engageable with each other to limit movement of pins 36 and 37 towards each other, responsive to corresponding movements of the arms 15 and 16. Thus, when tractor wheel 34 encounters an obstruction causing the wheel 34 to be elevated, as shown in Figure 2, arm 15 rises causing pin 37 to be rotated counterclockwise, as viewed in Figures 5 and 6, from the position of Figure 6 to the position of Figure 5. This transmits a corresponding rotation to link member 42 which transfers a force to the link member 40 acting through pin 36 on arm 16 which tends to rotate the pin 36 clockwise, as viewed in Figure 6, to the position of Figure 5, and which thus rotates the arm 16 downwardly to the dotted view position thereof shown in Figure 5. Therefore, as the wheel 34 rises, the wheel 35 is lowered, maintaining equalized loading on the wheels as the wheel 34 rises over the obstacle. As shown in Figure 5, the opposing lug elements 44 and 45 are arranged to abut with each other when a limiting difference in elevation between wheels 34 and 35 occurs. Similarly, when the wheel 35 tends to rise with respect to the wheel 34, the arm 16 rotates pin 36 counterclockwise, as viewed in Figure 6, to the position shown in Figure 7 and rotates pin 37 clockwise as link 42 follows the rotation of link 40.

In the previously described limiting positions of the arms 15 and 16, the lugs 44 and 45 abut each other rearwardly of the axis of the pivot bolt 21. In the opposite limiting positions of the arms, namely, wherein wheel 35 rises with respect to wheel 34, the lugs 44 and 45 are arranged to come into abutment with each other forwardly of the pivot bolt 21, as shown in Figure 7.

In the normal position of the wheels 34 and 35, as shown in Figure 6, the link member 39 is substantially vertical. In the position of link member 39 shown in Figure 5, namely, wherein wheel 34 is elevated with respect to wheel 35, the link member 39 is swung rearwardly from the position of Figure 6, whereas in the opposite situation, namely, wherein wheel 35 is elevated with respect to wheel 34, the link member 39 is swung forwardly from the position of Figure 6, as shown in Figure 7.

While a specific embodiment of an improved front wheel suspension for a farm tractor has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a tractor, a body, a depending support secured to the forward end of said body, a pair of arms rotatably connected to opposite sides of said support for rotation around a common transverse horizontal axis, respective axles carried by said arms, respective front wheels journaled on said axles, a first link bar pivotally connected to said support at a point spaced from said axis, a second link bar pivotally connecting said first link bar to one of said arms, and a third link bar pivotally connecting the other arm to an intermediate point on said second link bar, said link bars being formed and arranged to cause said arms to rotate in opposite directions around said transverse axis responsive to vertical displacement of the wheels.

2. In a tractor, a body, a depending support secured to the forward end of said body, a pair of arms rotatably connected to opposite sides of said support for rotation around a common transverse horizontal axis, respective axles carried by said arms, respective front wheels journaled on said axles, a first link bar pivotally connected to said support and depending therefrom at a point spaced rearwardly from said axis, a second link bar pivotally connecting the lower end of said first link bar to one of said arms at a point spaced above said axis, and a third link bar pivotally connecting a point on the other arm spaced below said axis to an intermediate point on said second link bar, said link bars being formed and arranged to cause said arms to rotate in opposite directions around said common transverse axis responsive to vertical displacement of the wheels.

3. In a tractor, a body, a depending support secured to the forward end of said body, a pair of arms rotatably connected to opposite sides of said support for rotation around a common transverse horizontal axis, respective axles carried by said arms, respective front wheels journaled on said axles, a first link bar pivotally connected to said support and depending therefrom at a point spaced rearwardly from said axis, a second link bar pivotally connecting the lower end of said first link bar to one of said arms at a point spaced above said axis, a third link bar pivotally connecting a point on the other arm spaced below said axis to an intermediate point on said second link bar, said link bars being formed and arranged to cause said arms to rotate in opposite directions around said common transverse axis responsive to vertical displacement of the wheels, and respective abutment lugs on the ends of the second and third link bars connected to said arms, said lugs being directed toward each other and being engageable with each other to limit rotation of said arms.

References Cited in the file of this patent

UNITED STATES PATENTS

| 1,915,607 | Haskins | June 27, 1933 |
| 2,209,093 | Ronning | July 23, 1940 |
| 2,222,857 | Ronning | Nov. 26, 1940 |